US012362164B2

(12) United States Patent
Higgins et al.

(10) Patent No.: US 12,362,164 B2
(45) Date of Patent: Jul. 15, 2025

(54) METHOD AND SYSTEM FOR REDUCING THE AMPLITUDE OF AN OSCILLATING ELECTRIC FIELD AT THE EQUILIBRIUM POSITION OF A TRAPPED ION

(71) Applicant: Alpine Quantum Technologies GmbH, Innsbruck (AT)

(72) Inventors: Gerard Higgins, Vienna (AT); Markus Hennrich, Sollentuna (SE)

(73) Assignee: Alpine Quantum Technologies GmbH, Innsbruck (AT)

( * ) Notice: Subject to any disclaimer, the term of this patent is extended or adjusted under 35 U.S.C. 154(b) by 411 days.

(21) Appl. No.: 18/006,168

(22) PCT Filed: Jul. 22, 2020

(86) PCT No.: PCT/SE2020/050748
§ 371 (c)(1),
(2) Date: Jan. 20, 2023

(87) PCT Pub. No.: WO2022/019815
PCT Pub. Date: Jan. 27, 2022

(65) Prior Publication Data
US 2023/0230828 A1 Jul. 20, 2023

(51) Int. Cl.
*H01J 49/42* (2006.01)
*G21K 1/00* (2006.01)

(52) U.S. Cl.
CPC ...... *H01J 49/4215* (2013.01); *H01J 49/4245* (2013.01); *H01J 49/4255* (2013.01)

(58) Field of Classification Search
CPC ............... H01J 49/4215; H01J 49/4245; H01J 49/4255; H01J 49/4205; G21K 1/00
See application file for complete search history.

(56) References Cited

U.S. PATENT DOCUMENTS 10,452,029 B2 10/2019 Katori
2017/0186595 A1* 6/2017 Monroe ................ H01J 49/022
(Continued)

FOREIGN PATENT DOCUMENTS

JP 2018510494 A 4/2018

OTHER PUBLICATIONS

Berkeland, et. al. Minimization of ion micromotion in a Paul trap. Journal of Applied Physics. vol. 83, No. 10. 1998. (Year: 1998).*
(Continued)

*Primary Examiner* — David E Smith
*Assistant Examiner* — Laura Eloise Tandy
(74) *Attorney, Agent, or Firm* — The Webb Law Firm

(57) ABSTRACT

Provided is a method of reducing the magnitude of a quasi-static electric dipole field at the null position of an oscillating electric quadrupole field of an ion trap. The method includes trapping at least one ion in a trapping electric field. The trapping electric field includes an electric field amplitude; using an interferometry sequence including applying a first laser pulse when the trapping electric field amplitude includes a first trapping electric field amplitude; applying a second laser pulse when the trapping electric field amplitude includes a second trapping electric field amplitude different from the first electric field amplitude; and measuring a state of the ion; repeating the interferometry sequence in order to obtain a plurality of measurements of the state of the ion; determining a probability that the trapped ion changes state; and adjusting the trapping electric field based on the determined probability.

22 Claims, 7 Drawing Sheets

(56) References Cited

U.S. PATENT DOCUMENTS

| | | | |
|---|---|---|---|
| 2018/0090304 | A1 | 3/2018 | Bennett |
| 2020/0082291 | A1 | 3/2020 | Debnath et al. |

OTHER PUBLICATIONS

Higgins et al., "Highly-polarizable ion in a Paul trap", Department of Physics, Stockholm University et al. 2019, 12 pages.

Leopold et al., "A cryogenic radio-frequency ion trap for quantum logic spectroscopy of highly charged ions", Review of Scientific Instruments, 2019, vol. 90, pp. 073201-1-073201-13.

* cited by examiner 706
707
Trapping field amplitude
0
Prepare ion in |g⟩
π/2 pulse
π/2 pulse
State detection
701
Time
702
703
704
705

800
1.0
0.5
0.0
Probability pe
−π
−π/2
0
π/2
Laser field phase difference ϕlaser
compensation electrode voltage
17.05V
17.80V
18.55V
802
801

900
1.0
0.5
0.0
Probability pe
−π
−π/2
0
π/2
Laser field phase difference ϕlaser
compensation electrode voltage
17.05V
17.80V
18.55V
902
901

METHOD AND SYSTEM FOR REDUCING THE AMPLITUDE OF AN OSCILLATING ELECTRIC FIELD AT THE EQUILIBRIUM POSITION OF A TRAPPED ION

CROSS-REFERENCE TO RELATED APPLICATION

This application is the United States national phase of International Application No. PCT/SE2020/050748 filed Jul. 22, 2020, the disclosure of which is hereby incorporated by reference in its entirety.

BACKGROUND OF THE INVENTION

Field of the Invention

The present disclosure relates to a method, system and software instructions for reducing the magnitude of a quasi-static dipole electric field at the position of a null of an oscillating electric quadrupole field. The application also relates to an optical clock; a quantum computing system; a quantum simulator system; a trapped ion electric field sensor; a trapped ion quantum network node and a trapped ion force sensor comprising the system. In particular, this disclosure relates to taking advantage of the electric field dependence of the equilibrium position of a trapped ion in order to identify imperfections, in the form of a dipole electric field at the null of an oscillating quadrupole field, in the trapping electric field and to use identified imperfections in order to reduce the magnitude of the dipole field at the said null.

SUMMARY OF THE INVENTION

According to a first aspect of the present disclosure, there is provided a method of reducing the magnitude of a quasi-static electric dipole field at the null position of an oscillating electric quadrupole field of an ion trap, the method comprising:

- trapping one or more ions in a trapping electric field, wherein the trapping electric field comprises the oscillating electric quadrupole field and wherein the trapping electric field comprises an electric field amplitude which is a function of an electric field amplitude of the oscillating electric field;
- inducing a change in an equilibrium position of one of the one or more trapped ions and measuring said change using an interferometry sequence comprising:
  - applying a first laser pulse to the one of the one or more trapped ions when the trapping electric field amplitude comprises a first trapping electric field amplitude;
  - applying a second laser pulse to the one of the one or more trapped ions when the trapping electric field amplitude comprises a second trapping electric field amplitude different from the first electric field amplitude; and
  - measuring a state of the one of the one or more trapped ions after the application of the first and second laser pulses;
- repeating the interferometry sequence a plurality of times in order to obtain a plurality of measurements of the state of the one or more trapped ions; and
- determining a probability that the one or more trapped ions change state during the interferometry sequence based on the plurality of measurements of the state of the ion.

In one or more embodiments, the method may further comprise adjusting the trapping electric field based on the determined probability in order to reduce the magnitude of the quasi-static electric dipole field at the null position of the oscillating electric quadrupole field of the ion trap. In one or more embodiments, the method may further comprise adjusting one or more parameters of the system in which the one or more trapped ions are implemented to account for unwanted electric field effects. In either approach, the probability that the trapped ion, or the ions, changes state during the interferometry sequence is indicative of the magnitude of the quasi-static electric dipole field at the null of the oscillating electric quadrupole field of the ion trap and the effects on the system in question can be reduced by either adjusting the trapping electric field or adjusting the parameters of the system.

In one or more embodiments, determining the probability of the trapped ion being in a given state may comprise calculating the statistical likelihood of the ion moving from a first state to a second state during the interferometry sequence. In one or more embodiments, the state of the ion may refer to the electronic state in which an unpaired valence electron is situated. In one or more embodiments, the state of the ion may refer to the electronic state of one or more valence electrons in an atomic ion, or a molecular orbital state of a molecular ion. In one or more embodiments, the state of the ion may refer to an atomic hyperfine state of an atomic ion, or a molecular hyperfine state of a molecular ion.

In one or more embodiments, adjusting the electric field may comprise one or more of: altering the voltage applied to one or more compensation electrodes; moving one or more electrodes configured to generate the trapping electric field; and changing the voltage on one or more electrodes configured to generate the trapping electric field.

In one or more embodiments, the trapping electric field may further comprise a static electric field and wherein the trapping electric field amplitude is additionally comprised of an electric field amplitude of the static electric field.

In one or more embodiments, repeating the interferometry sequence may be performed the plurality of times by one or a combination of:

- performing the interferometry sequence on the same trapped ion a plurality of times; and/or
- trapping a plurality of ions in the oscillating electric field and performing the interferometry sequence on each of the ions.

In one or more embodiments, the first laser pulse may comprise a resonant pi/2 pulse and the second laser pulse may comprise a resonant pi/2 pulse.

In one or more embodiments, the first laser pulse and the second laser pulse may be coherent laser pulses and the first laser pulse and the second laser pulse may have a phase difference of pi/2.

In one or more embodiments, the second laser pulse may be provided at least a predetermined delay after the first laser pulse.

In one or more embodiments, the steps of:

- repeating the interferometry sequence a plurality of times in order to obtain a plurality of measurements of the state of the ion; and
- determining a probability that the trapped ion changes state during the interferometry sequence based on the plurality of measurements of the state of the ion;
- may be performed a first plurality of times wherein, for each repeat of these steps in the first plurality of times, a different phase difference between the first laser pulse and the second laser pulse is used; and wherein adjusting the trapping electric field may be based on the first plurality of measurements of the probability.

In one or more embodiments, the steps of:

repeating the interferometry sequence a plurality of times in order to obtain a plurality of measurements of the state of the ion; and determining a probability that the trapped ion changes state during the interferometry sequence based on the plurality of measurements of the state of the ion;

may be performed a second plurality of times wherein, for each repeat of these steps in the second plurality of times, a different trap stiffness change is applied to the trapping electric field amplitude between the first and second laser pulses, wherein the trap stiffness change depends on the difference between the first electric field amplitude and the second electric field amplitude; and wherein adjusting the trapping electric field may be based on the second plurality of measurements of the probability.

In one or more embodiments, for each of the first plurality of times the steps of:

repeating the interferometry sequence a plurality of times in order to obtain a plurality of measurements of the state of the ion; and determining a probability that the trapped ion changes state during the interferometry sequence based on the plurality of measurements of the state of the ion, the steps of:

repeating the interferometry sequence a plurality of times in order to obtain a plurality of measurements of the state of the ion; and determining a probability that the trapped ion changes state during the interferometry sequence based on the plurality of measurements of the state of the ion may be repeated the second plurality of times such that a plurality of probabilities are obtained at combinations of different phase differences and different trap stiffness changes; and wherein adjusting the trapping electric field may be based on all of the determined probabilities.

In one or more embodiments, a first time the steps of:

repeating the interferometry sequence a plurality of times in order to obtain a plurality of measurements of the state of the ion; and determining a probability that the trapped ion changes state during the interferometry sequence based on the plurality of measurements of the state of the ion are performed, the method may comprise providing the first and second laser pulses along a first direction; and a subsequent time the steps of:

repeating the interferometry sequence a plurality of times in order to obtain a plurality of measurements of the state of the ion; and determining a probability that the trapped ion changes state during the interferometry sequence based on the plurality of measurements of the state of the ion are performed, the method may comprise providing the first and second laser pulses along a second direction, different to the first direction wherein adjusting the trapping electric field may be based on the first and subsequently determined probabilities. It will be appreciated that the plurality of repetitions of the interferometry sequence of the first time and the plurality of repetitions of the interferometry sequence of the subsequent time may be performed either sequentially, i.e., wherein the all of the repetitions of the first time are performed followed by all of the repetitions of the subsequent time, or may be performed in an interleaved matter, i.e., one or more of the first repetitions of the first time may be taken followed by one or more of the repetitions of the subsequent time followed by one or more of the repetitions of the first time and so on.

In one or more embodiments, each of the first and second direction may have one of:

a directional vector entirely in the plane of the oscillating electric field; or a directional vector having a component out of the plane of the oscillating electric field. In these embodiments, the method may be performed with a system arranged as a linear Paul trap.

In one or more embodiments, the first and second directions may be relatively orthogonal directions.

In one or more embodiments, the method may further comprise:

measuring a detuning of a laser from a transition resonance frequency using interferometry by:

applying a first laser pulse to the trapped ion when the electric field amplitude comprises a fixed electric field amplitude and the first laser pulse has a first phase;

applying a second laser pulse to the trapped ion when the electric field amplitude comprises the fixed electric field amplitude and the second laser pulse has a second phase different to the first phase; and measuring a state of the ion after the application of the first and second laser pulses;

repeating the process of measuring the detuning of the laser a plurality of times in order to obtain a plurality of measurements of the state of the ion;

determining a fixed electric field amplitude probability of the trapped ion being in the given state based on the plurality of measurements of the state of the ion;

wherein detuning of the laser may be accounted for based on the fixed electric field amplitude probability.

In one or more embodiments, the method may comprise alternating between determining the state of the trapped ion at electric field amplitudes which change between the first and second waveform pulses and determining the state of the trapped ion at the fixed electric field amplitude. In one or more embodiments, the same predetermined delays may be used whether the electric field amplitude is varying or fixed.

In one or more embodiments, the average of the square of the amplitude of the oscillating electric field of the ion trap while the first laser pulse is applied and the square of the amplitude of the oscillating electric field of the ion trap while the second laser pulse is applied may be equal to the square of the amplitude of the oscillating electric field of the ion trap during an operational mode. In one or more embodiments, the state of the ion may be measured by fluorescence detection. In one or more embodiments, the fluorescence detection may be preceded by a quantum logic transfer step of quantum logic spectroscopy experiments. In one or more embodiments, the ion trap comprises a linear Paul trap or a ring Paul trap.

According to a second aspect of the present disclosure, there is provided a system configured to reduce the magnitude of a quasi-static electric dipole field at the null position of an oscillating electric quadrupole field of an ion trap comprising:

a plurality of electrodes configured to generate a trapping electric field for trapping one or more ions wherein the trapping electric field comprises the oscillating electric quadrupole field and wherein the trapping electric field comprises an electric field amplitude which is a function of an electric field amplitude of the oscillating electric field;

a first laser configured to apply laser pulses to the trapped ion and a detector;

the system configured to induce a change in equilibrium position of one of the one or more trapped ions and use interferometry to measure said change using an interferometry sequence, by controlling:

the laser to apply a first laser pulse to the one of the one or more trapped ions when the electric field amplitude comprises a first electric field amplitude and to apply a second laser pulse to the one of the one or more trapped ions when the electric field amplitude comprises a second electric field amplitude different from the first electric field amplitude; and the detector to measure the state of the one of the one or more trapped ions after the application of the first and second laser pulses;

wherein the system is further configured to:

repeat the interferometry sequence a plurality of times in order to obtain a plurality of measurements of the state of the one or more trapped ions;

determine a probability that the one or more trapped ions change state during the interferometry sequence based on the plurality of measurements of the state of the ion; and adjust the trapping electric fields based on the probability in order to reduce the magnitude of the quasi-static electric dipole field at the null position of the oscillating electric quadrupole field.

According to a third aspect, there is disclosed a computer readable medium having stored thereon software instructions that, when executed by a processor, cause the processor to generate control signals to cause a system of the second aspect to perform the method of the first aspect.

According to a fourth aspect of the present disclosure, there is provided an optical clock comprising the system of the second aspect.

According to a fifth aspect of the present disclosure, there is provided a quantum computing system comprising the system of the second aspect.

According to a sixth aspect of the present disclosure, there is provided a quantum simulator system comprising the system of the second aspect.

According to a seventh aspect of the present disclosure, there is provided a trapped ion electric field sensor comprising the system of the second aspect.

According to an eighth aspect of the present disclosure, there is provided a trapped ion force sensor comprising the system of the second aspect.

BRIEF DESCRIPTION OF THE DRAWINGS

One or more embodiments will now be described by way of example only with reference to the accompanying drawings in which.

DESCRIPTION OF THE INVENTION

Figure 1A:
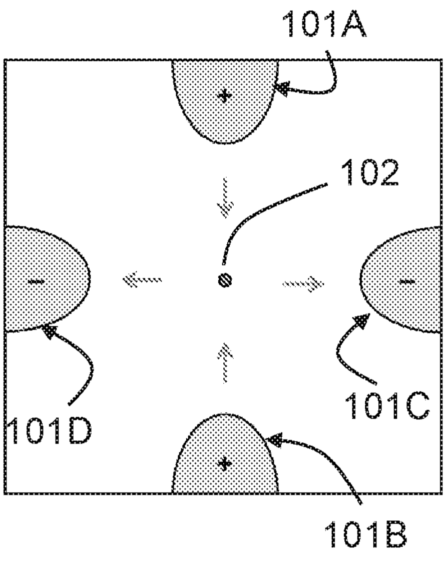
FIGS. 1A-1B show an example of the electric quadrupole arrangement configured to generate the oscillating electric field of an ion trap.
Figure 1B:
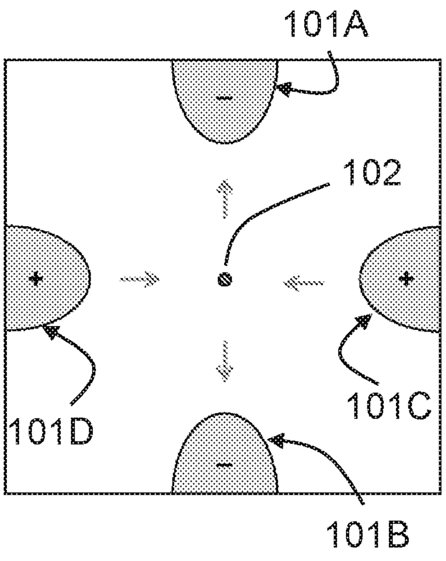

Ions can be trapped in a variety of configurations of ion traps by using arrangements of electric fields. These arrangements can comprise at least one oscillating electric field (such as a radio frequency, RF, quadrupole field) and, in some examples, may also include one static electric field. FIGS. 1A-1B show an example of how an ion is trapped in an oscillating electric field. In this example, at a first time instant, diagonally opposing electrodes are charged with the same polarities. As shown in FIG. 1A, a first pair of electrodes 101A, 101B are positively charged and a second pair of electrodes 101C, 101D are negatively charged. Assuming a positively charged ion 102, an ion 102 near the centre of the trap is attracted towards the negatively charged electrodes 101C, 101D and it is repulsed from the positively charged electrodes 101A, 101B. As shown in FIG. 1B, at a second time instant, the charges of the electrodes 101A, 101B, 101C, 101D may be inverted such that the first pair of electrodes 101A, 101B are negatively charged and the second pair of electrodes 101C, 101D are positively charged. This causes the ion to then be attracted to electrodes 101A, 101B and repulsed from electrodes 101C, 101D. By alternating between the configuration of FIG. 1A and the configuration of FIG. 1B, the time-averaged force acting on the ion may be towards the centre of the trap such that the ion is dynamically trapped, as is simplistically shown in FIG. 2.

It will be appreciated that the examples shown in FIGS. 1A-1B show a simplified two-dimensional example of an ion trap. In order to provide for trapping in the third dimension, out of the plane in the examples of FIGS. 1A-1B, several different options can be used. In the arrangement of a linear ion trap, a static (DC) electric field may be generated by electrodes having a like-charge arranged on either side of the ion in the third dimension.

Figure 2:
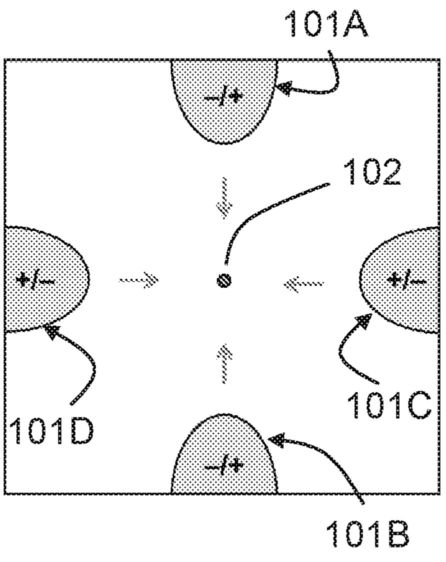
FIG. 2 shows an example of the time averaged effect of the oscillating electric field of FIGS. 1A and 1B of the ion trap.

The time-averaged position of a trapped ion shown in FIG. 2 is referred to as the trapped ion's equilibrium position. At a trapped ion's equilibrium position the time-averaged electric field is zero. Usually ion traps are configured with the aim of having the equilibrium position of a trapped ion coincide with a null of the oscillating trapping electric field. Trap imperfections and external field sources may give rise to a slowly varying (quasi-static) unwanted dipolar electric field near the centre of an ion trap. A quasi-static offset field at the null position of the oscillating field causes the equilibrium position of a trapped ion to be shifted from the null of the oscillating field by $$u_i \approx \frac{qE_i}{m\omega_i^2} \qquad \text{Eq. 1}$$

Where orthogonal directions defined by the ion's secular motion are indexed by i, $u_i$ is the displacement of the ion equilibrium position from the null position of the oscillating field in the i direction, q is the ion charge, $E_i$ is the component of the quasi-static offset field in the i direction, m is the ion mass, $\omega_i$ is the frequency of the ion's secular motion in the i direction. As a result, a trapped ion will experience an oscillating electric field at its equilibrium position. This unwanted oscillating field will cause the ion to exhibit additional motion at the frequency of the oscillating field, called excess micromotion. This unwanted field will also exacerbate the Stark effect on the energy levels of the ion.

If effects of the unwanted offset field on the ion can be accurately measured, then information about the unwanted offset electric fields may be determined and, therefrom, it may be possible to make changes to the system in order to account for the unwanted offset electric field. It may also be possible that if effects of the unwanted offset field on the ion can be accurately measured, changes may be made to the system to reduce these effects, and this may include reduction of the magnitude of the unwanted offset field.

It is possible to measure excess micromotion using techniques such as the measurement of modulation of ion fluorescence as a result of micromotion, and measuring the strength of resonance sidebands in transition spectra as a result of micromotion. The techniques mentioned above, however, suffer from the disadvantage of lower resolution compared to that of the systems and methods that are described below. One of the disadvantages of the ion fluorescence measurement is that the measurement results are sensitive to the radiation pressure of the laser field used. One of the disadvantages of the sideband method is that a measurement result in one direction gives information about the magnitude of a component of the offset field, but not about the sign of the component of the offset field. These disadvantages do not apply to the technique disclosed below.

The technique disclosed below may provide for determination of the unwanted offset electric field at a higher accuracy and in a shorter interrogation time than achieved using prior techniques.

Another effect sensitive to the unwanted offset field is the change of the trapped ion equilibrium position when the amplitude of the trapping fields is changed. A change of the amplitude of the trapping fields causes the ion's secular frequencies to change $\omega_{i1} \rightarrow \omega_{i2}$ and the ion's equilibrium position to change:

$$\Delta u_i \approx \frac{qE_i}{m}\left(\frac{1}{\omega_{i2}^2} - \frac{1}{\omega_{i1}^2}\right) \qquad \text{Eq. 2}$$

This change in equilibrium position Δu can be detected using an imaging system. The resolution of such a technique in the object plane is limited by the resolution with which the position of the trapped ion can be determined, where that resolution is the diffraction limit. Further, this technique is less sensitive to movement of the ion out of the object plane, which gives rise to defocussing. This technique is less sensitive to a change of ion equilibrium position Δu, and to the offset electric fields E that causes it, than the technique presented herein.

Figure 3:
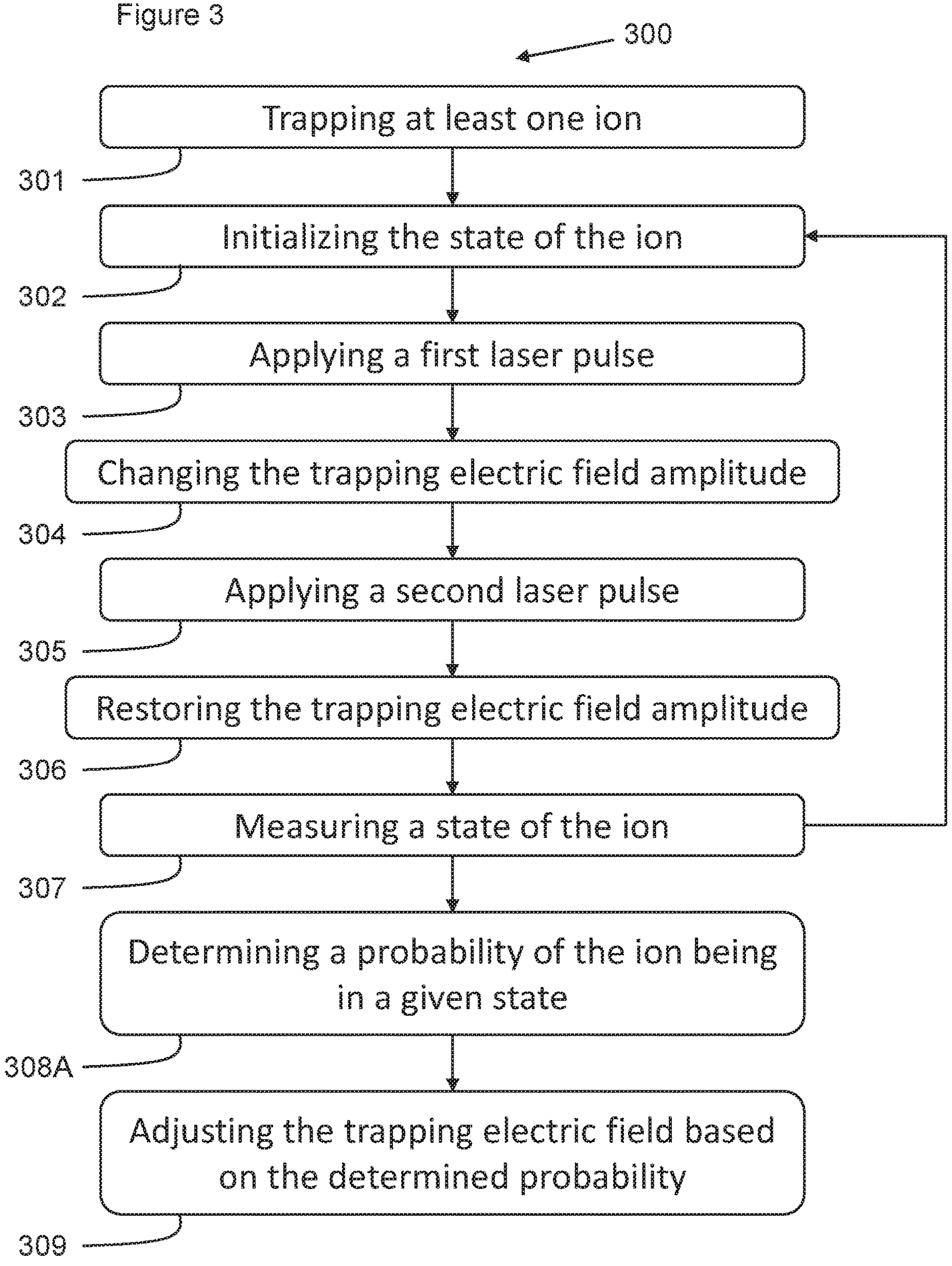
FIG. 3 shows an example embodiment of a method for reducing the magnitude of a quasi-static electric dipole field at the null position of the oscillating electric quadrupole field of an ion trap.

FIG. 3 shows a method 300 of reducing the magnitude of an offset field at the null position of an oscillating electric field used for trapping an ion.

The oscillating electric field may oscillate at RF frequencies. However, it will be appreciated that the oscillating electric field may oscillate at any frequency suitable to maintain the trapping of the trapped ion. For example, the oscillating electric field may oscillate at frequencies between 10 kHz and 10 GHz. In some examples, the oscillating electric field may oscillate at frequencies between 1 and 100 MHz. In some examples, the oscillating electric field may oscillate at frequencies between 5 and 20 MHz.

The oscillating quadrupole electric field may be generated by four electrodes, as described with reference to FIG. 1, where a first pair of diametrically opposed electrodes of the four electrodes are each configured to have a first voltage and a second pair of diametrically opposed electrodes of the four electrodes are each configured to have a second voltage different from the first voltage. The electrodes are configured such that the polarity of the first electrode pair is opposite of that of the second electrode pair, i.e., when the first pair of electrodes have a positive charge thereon, the second pair of electrodes have a negative charge thereon and vice versa. The magnitude of the potential at the electrodes may be varied during operation, as is described further below. In one or more examples the voltage on the first pair of electrodes may be set to a fixed value while an RF voltage is applied to the second pair of electrodes.

It will be appreciated that, while quadrupole is often used herein to refer to the structure of the type of electric field, other arrangements of electric field may be implemented. For example, an octupole electric field, or even higher order, may be implemented instead. In yet other examples, combinations of quadrupole, octupole or higher order electric fields may be implemented. Further, any reference to quadrupole, octupole or other order of electric field arrangement does not preclude the use of one or more compensation electrodes configured to contribute to the electric field and, thereby, reduce the dipole electric field magnitude at the position of the null of the oscillating electric field.

By reducing the magnitude of the dipole offset electric field at the position of the null of the oscillating electric field, the dependence of the ion's equilibrium position on the electric field amplitude is reduced. Reducing the dependence of the equilibrium position on the electric field amplitudes advantageously reduces the excess micromotion of the ion and also reduces the undesired Stark effect on the states of the ion.

Herein, ion may refer to any of an atomic ion or a molecular ion where, in either case, the ion may comprise a single valence electron or a plurality of valence electrons. The ion may have a hyperfine structure.

The method may comprise trapping 301 at least one ion in a trapping electric field wherein the trapping electric field comprises an oscillating electric quadrupole field and may further comprise a static quadrupole electric field. The trapping electric field comprises an electric field amplitude which is a function of an electric field amplitude of the oscillating electric field and the electric field amplitude of the static electric field. As such, it will be appreciated that references to changing the trapping electric field amplitude may refer to changing one or both of the oscillating electric field amplitude and the static electric field amplitude. The oscillating and static electric field amplitudes may be changed by changing the amplitude of the voltages applied to the electrodes configured to generate those fields. A change of the trapping electric field amplitude would cause the ion's secular frequencies to change $\omega_{i1} \rightarrow \omega_{i2}$. As such, with reference to Equation 2, this would cause the ion equilibrium position to change by $\Delta u$.

The method further comprises inducing a change in an equilibrium position of the at least one trapped ion and measuring said change using an interferometry sequence. As can be seen from Equation 2, changing the ion's secular frequencies, $\omega_{i1} \rightarrow \omega_{i2}$, results in a shift $\Delta u$ in the equilibrium position of the trapped ion if there is an offset electric field E. The secular frequencies are changed by changing the amplitude of the voltages applied to the electrodes to generate the trapping fields.

Performing the interferometry sequence comprises applying 303 a first laser pulse to the trapped ion and subsequently applying 305 a second laser pulse to the trapped ion. The laser pulses may be provided by one or more lasers. The application of a laser pulse causes a change in the state of the ion. More particularly, two different states of the ion may be considered where the laser field resonantly couples the two states. In other words, the laser field is resonant to the transition between the two states. In some examples, the ion might be prepared in a plurality of initial states and the laser might drive transitions between the plurality of initial states to a corresponding plurality of final states.

The method further comprises measuring 307 a state of the ion after the application of the first and second laser pulses. It will be appreciated herein that measuring the state is performed after the application of both of the first and second laser pulses (i.e., after the whole pulse sequence has completed), and not individually after each of the first and second laser pulses such that two measurements are obtained. The final state of the ion after interferometry can be measured using any suitable technique. In one or more embodiments, the final state of the ion may be measured using a fluorescence measurement. The final state of the trapped ion may also be measured using a technique used in quantum logic spectroscopy, whereby the state of the ion is coupled to the state of a second ion, a subsequent fluorescence measurement of the state of the second ion reveals the state of the ion. The phase difference, $\phi$, of the laser fields during the first laser pulse and during the second laser pulse experienced by the ion determines the ion's final state with:

$$p_e = \frac{1}{2}(1 + \cos\phi) \qquad \text{Eq. 3}$$

where $\rho_e$ is the probability of finding the ion in an excited state, e. It will be appreciated that this describes the idealised relationship but that experimental imperfections may include errors in pulse lengths and decoherence, as such, the probability variation may differ from the presented equation in true experimental conditions. The phase difference $\phi$ may be adjusted by:

(i) controlling the phase difference of the laser field between the two laser pulses $\phi_{laser}$; and (ii) changing the position of the ion between application of the two laser pulses. If the ion is displaced by $\Delta u$, this introduces a contribution to the phase difference of:

$$\phi_{mm} = \sum_i k_i \Delta u_i \qquad \text{Eq. 4}$$

where $k_i$ is the component of the laser field wavevector in the i direction. Thus:

$$p_e = \frac{1}{2}[1 + \cos(\phi_{laser} + \phi_{mm})] \qquad \text{Eq. 5}$$

Each time the interferometry sequence is performed, the state of the ion in that instance will be determined. Repeating the process of inducing the change in equilibrium position of the at least one trapped ion and measuring the final state of the at least one trapped ion a plurality of times will allow a probability of the trapped ion being in a given state to be calculated. Repeating the process of inducing the change in equilibrium position of the at least one trapped ion and measuring the final state of the at least one trapped ion a plurality of times may be represented as a loop repeated N times of the steps: initializing 302 the state of the ion; applying 303 the first laser pulse; changing 304 the trapping electric field amplitude from a first trapping electric field amplitude to a second trapping electric field amplitude; applying 305 the second laser pulse; restoring 306 the trapping electric field amplitude to the first trapping electric field amplitude; and measuring 307 the state of the ion.

The method 300 also includes determining 308A the probability of the trapped ion being in a given state. This may, for example, comprise calculating the fraction of the plurality of measurements in which the state of the ion is e.

It will be appreciated that, generally, one may discuss exciting the ion into a higher state from a lower state. However, the ion may equally be driven into a lower state from a higher state. Additionally, regardless of whether the ion is driven into a higher or lower state, the probability of the ion being in either of those states may be determined at step 308A.

Because the final state of the ion after the interferometry sequence has concluded depends on the change of the ion position $\Delta u$, interferometry can be used to measure the unwanted offset electric field E which causes excess micromotion and exacerbates Stark shifts. By changing the trapping electric field amplitude between the first and second laser pulses, a change in the equilibrium position of the ion $\Delta u$ can be induced causing the phase shift between the laser fields experienced by the ion during the two pulses to have the contribution:

$$\phi_{mm} = \sum_i \frac{q k_i E_i}{m}\left(\frac{1}{\omega_{i2}^2} - \frac{1}{\omega_{i1}^2}\right) \qquad \text{Eq. 6}$$

Information about the unwanted offset electric field E may be determined by: inducing the change in the equilibrium position $\Delta u$ of the at least one trapped ion; applying the first and second laser pulses 303, 305; measuring 307 said change a plurality of times; and determining 308A the probability of the ion being in a given state. By combining Equations 5 and 6 and taking into account the other variables and constants of the equation, which are either known or may be independently determined, the component of the unwanted offset electric field E in the direction $$d = \begin{pmatrix} k_x\left(\frac{1}{\omega_{x2}^2} - \frac{1}{\omega_{x1}^2}\right) \\ k_y\left(\frac{1}{\omega_{y2}^2} - \frac{1}{\omega_{y1}^2}\right) \\ k_z\left(\frac{1}{\omega_{z2}^2} - \frac{1}{\omega_{z1}^2}\right) \end{pmatrix} \quad \text{Eq. 7}$$

can be determined.

Having calculated the probability of the ion being in a given state, the method can calculate one or more pieces of information such as $\phi_{mm}$ or the component of E in the direction d. The method may comprise adjusting 309 the trapping electric field in order to reduce the magnitude of E in the direction d, as discussed in detail below, based on the probability of the ion being in the given state and/or one or more pieces of the calculated information. This may thereby reduce the magnitude of the unwanted offset electric field E at the position of the null of the oscillating trapping electric field.

Adjusting 309 the trapping electric field may comprise one or more of:

- applying or changing a static voltage at one or more electrodes configured to generate the trapping electric field;
- moving one or more of the electrodes configured to generate the trapping electric field relative to the trapped ion;
- adjusting the trapping electric field by applying or changing a voltage at one or more compensation electrodes; and
- moving one or more of the compensation electrodes relative to the trapped ion.

Taking any of the above actions will change the local electric field around the ion and, if done based on the probability of the ion being in a given state as described, will advantageously reduce the magnitude of the unwanted offset electric field Eat the position of the null of the oscillating trapping electric field.

Figure 4:
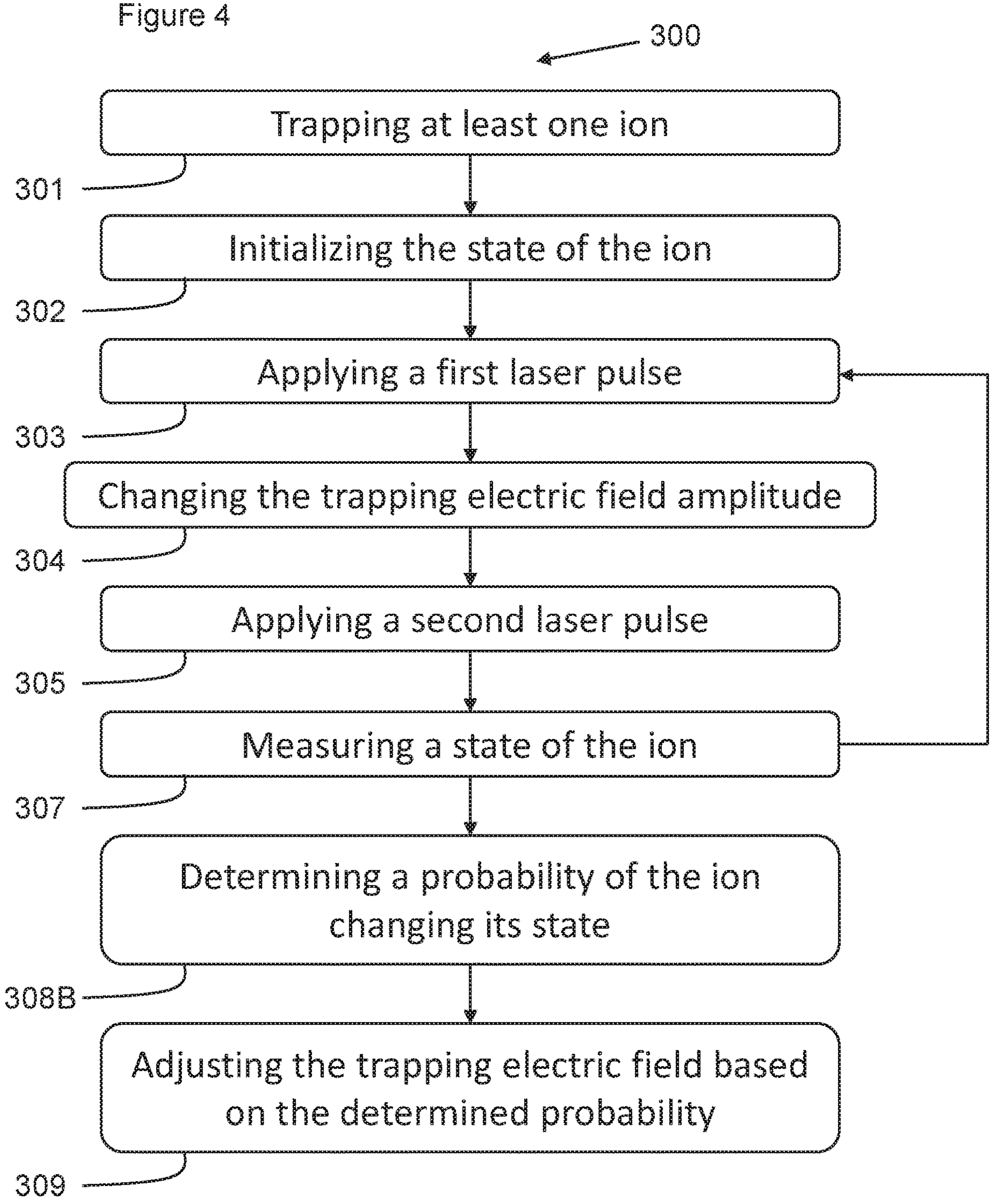
FIG. 4 shows a second example embodiment of a method for reducing the magnitude of a quasi-static electric dipole field at the null position of the oscillating electric quadrupole field of an ion trap

FIG. 4 shows a simpler version of the sequence presented in FIG. 3. In FIG. 4 the initialisation step 302 is not repeated in each iteration, because the state of the ion before application of the first laser pulse will be known from the previous measurement step. This would mean that instead of determining the probability of the ion being excited to state |e> (step 308A) that instead the probability of the state changing would be determined (step 308B). It will be appreciated that, in the first measurement, determining the probability of the ion being in a given state 308A may be directly equivalent to determining a probability of the ion changing its state when 308A is performed after an initialisation step.

Another simplification that may be introduced is the application of only one change of the amplitude of the trapping electric field during the sequence (step 306 is removed). In this case, the iterations may alternate between iterations in which the trapping field amplitude is decreased (and the ion is displaced by $\Delta u$) and iterations in which the trapping field amplitude is increased (and the ion is displaced by $-\Delta u$). The interferometry measurements in each case would be sensitive to the phase offsets $\phi_{mm}$ and $-\phi_{mm}$, respectively. This can be accounted for during step 307.

Figure 5:
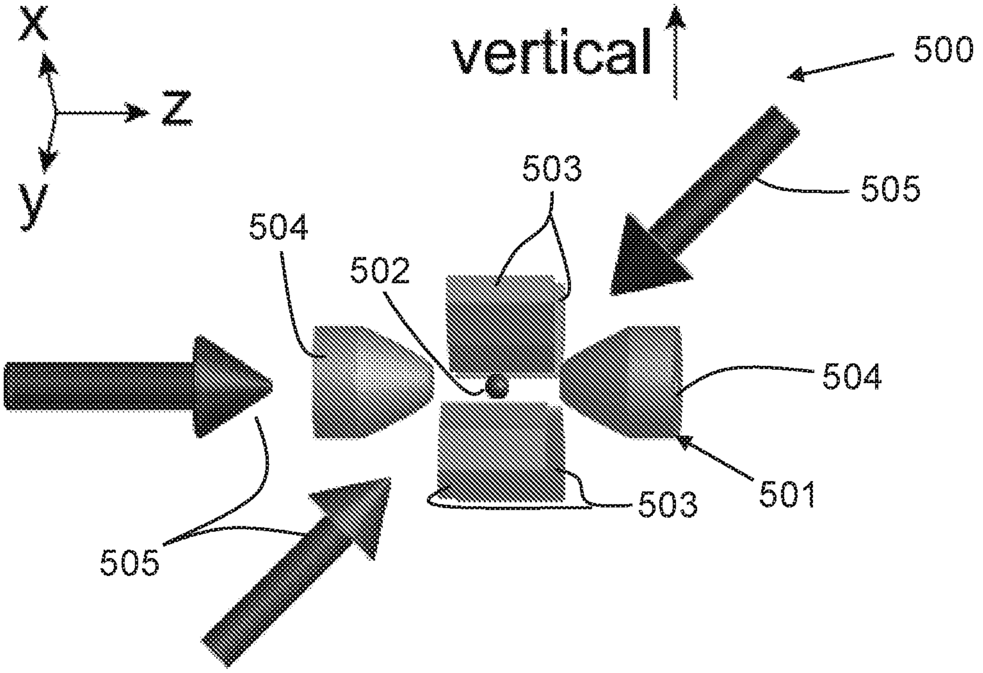
FIG. 5 shows an example system comprising a linear ion trap.
Figure 6:
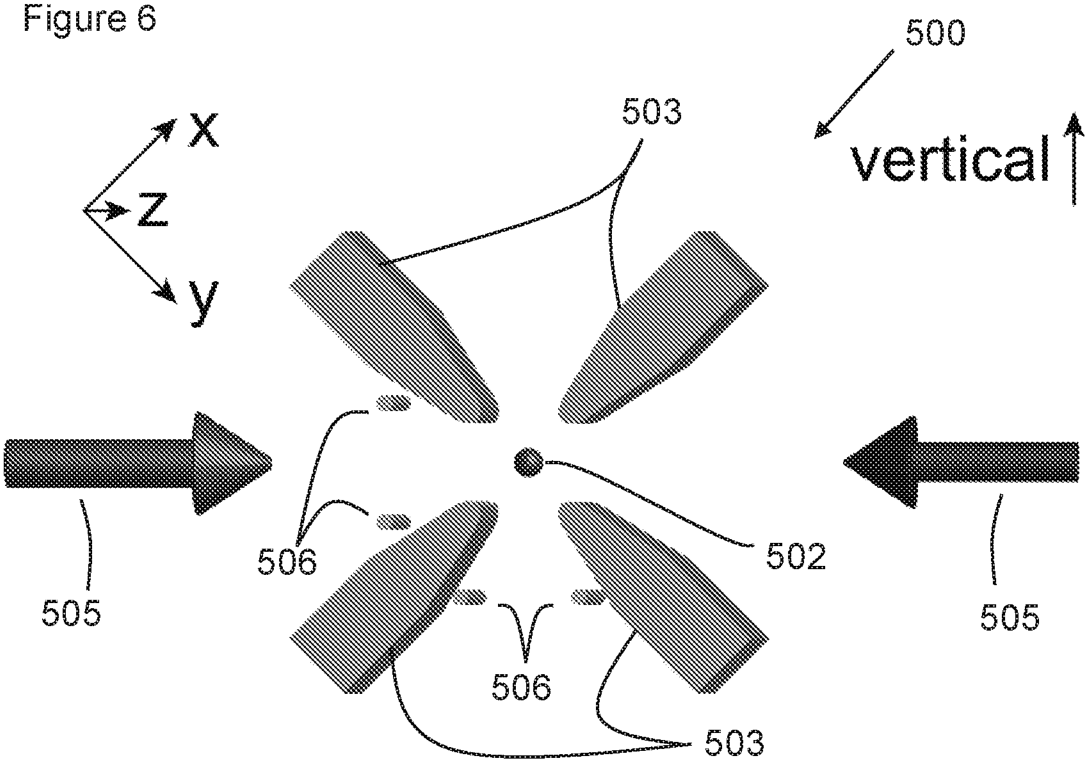
FIG. 6 shows the example system comprising an ion trap in a view substantially looking along the axial direction.

FIGS. 5 and 6 shows an example system 500 comprising a linear ion trap and laser geometry configured to carry out the above-described method. The example ion trap represented in FIGS. 5 and 6 comprise a linear ion trap 501 using a quadrupole electric field arrangement. It will be appreciated, however, that any suitable ion trap arrangement may be used such as, but not limited to, a hyperbolic ion trap, linear ion trap, a ring ion trap, a cylindrical ion trap, a planar ion trap, a wheel ion trap, or a sandwich ion trap. In this example, a $^{88}Sr^+$ ion 502 is confined in the linear ion trap 501 and the subsequently described experimental details are suitable for trapping a $^{88}Sr^+$ ion. It will be appreciated that other ions may be used in this arrangement, and the same or different experimental parameters may be used to trap the ion such as different electrode configurations, different laser arrangements and different laser frequencies.

In this example, voltages are applied to four gold-coated blade electrodes 503 to confine the ion in the x and y radial directions. The voltages on these four blade electrodes 503 are configured to generate the oscillating electric field in the x, y plane. Static voltages are applied to two gold-coated endcap electrodes 504 to confine the ion in the, z, axial direction. Any other suitable electrode design may be used. The co-ordinate axes defined in the figures are defined by the ion's secular motion and the electrode 503, 504 geometry. As such, the electrodes 503 are configured to generate the oscillating electric field in the x, y plane. The electrodes 503 may also generate a static electric field which produces the non-degeneracy of the radial modes, $\omega_x$ and $\omega_y$. The electrodes 504 configured to generate the static electric field which provides confinement along the z direction are arranged in diametric opposition along the z direction. It will be appreciated that, while the electrodes 504 configured to generate the static electric field may start in a diametrically opposed arrangement, the exact relative position of these electrodes 504 may be adjusted in order to reduce the magnitude of the quasi-static electric dipole field at the null position of the oscillating electric quadrupole field. The relative position of the electrodes 503 may also be adjusted in order to reduce the magnitude of the quasi-static electric dipole field at the null position of the oscillating electric quadrupole field.

In the following section, directional vectors will be referred to in the format (x, y, z). In this example, three 674 nm laser beams 505 are provided to illuminate the ion with unnormalized propagation directions of (0, 0, 1), (−1, 1, 42) and (−1, −1, 0). These independently controllable laser beams may be provided by a single laser or may be provided by a plurality of lasers. In one or more embodiments, the axial (0, 0, 1) laser beam 505 may be configured to propagate through one or more holes in the endcap electrodes.

A first laser, such as the laser arranged along (−1, −1, 0) may be configured to provide the first and second laser pulses with a wavevector k in the plane of the oscillating electric field. In one or more embodiment, a further laser may be provided along another direction in the plane, or having components in the plane, of the oscillating electric field which is also configured to provide the laser pulses of the interferometry sequence. As previously described, the probability of the ion 502 being in a given state can be calculated when a laser field wavevector k is used and, therefrom, information about the electric field E in the d direction may be obtained. The system may be configured such that each laser is configured to provide the one or more laser pulse sequences separately in order to determine the probability of the ion being in a given state when laser pulses are provided along different k directions so information about the electric field in different d directions may be determined, that a 2D or 3D measurement of offset electric field E can be determined. It will be appreciated that, where a measurement is sensitive to the offset field E in a direction d which has components $d_{\parallel}$ in the plane of the oscillating electric field and $d_{\perp}$ out of the plane of the oscillating electric field and a value of $E_{\parallel}$ is being sought which is in the plane of the oscillating electric field, it will be necessary to resolve the components of the electric field in the direction $d_{\parallel}$. The axial laser may also be used to measure unwanted electric fields in the z direction by using the method 300 of FIG. 3 or 4. It will be appreciated that in an ideal linear Paul trap there is no oscillating field along the axial direction, but that imperfections, such as machining imperfections, may give rise to such an oscillating field along the axial direction. This unwanted field may be probed using the technique disclosed herein, using a laser beam which has a wave vector with an axial component. It will be appreciated that, where measurements of the unwanted electric field are sought in the x, y and z directions, it may be particularly beneficial for the lasers that are configured to provide the two laser pulses and for the changes of the trapping field amplitudes to be arranged such that the different directions dare orthogonal to each other. It may also be beneficial for the lasers that are configured to provide both the one or more laser pulse sequences and the changes of the trapping field amplitudes, to be arranged such that the different directions d are aligned with the x, y and z axes which are defined by the ion's secular motion.

A Doppler cooling laser may be provided, such as the laser in the (1, −1, √2) direction 505 in FIG. 5. The Doppler cooling laser may be configured to provide a laser configured to slow the movement of the ion and, thereby, increase the degree to which the interferometry results are described by Equation 3. An additional Doppler cooling laser beam may be employed when radial secular frequencies of the system are degenerate, such as the laser in the (1, 1, 0) direction 505 in FIG. 6.

One of the lasers 505 of the system 500 may comprise a repump laser. The repump laser may be configured to counter optical pumping to an unwanted state driven by the Doppler cooling laser beam. One of the lasers of the system 500 may comprise a quench laser. The quench laser 505 may be configured to transfer an ion from an excited state to the ground state. The Doppler cooling, repump and quench laser beams 505 may be configured to copropagate. Due to experimental set-up restrictions, optical access to the ion may be restricted. Providing for copropagating laser beams 505 may allow the beams to be focussed together and thereby make efficient use of available set-up space.

By way of specific example for illustrative purposes, a strontium 88 ion may be initialised in a particular sublevel of its ground state $5S_{1/2}$ by optical pumping. A pulse of 674 nm laser light may transfer the ion from state $5S_{1/2}$ mJ=½ to $4D_{5/2}$ mJ=−3/2. A pulse of the 1033 nm laser light may transfer the ion from $4D_{5/2}$ to $5P_{3/2}$, from which it may decay to either sublevel of $5S_{1/2}$. The process does not affect the ion if it was initially in state $5S_{1/2}$ mJ–½. By repeating this process (typically 10 times) if the ion was initially in state $5S_{1/2}$ $m_J$=½, it will likely finish in $5S_{1/2}$ mJ=−½. The 1092 nm laser field is turned on during this process to prevent optical pumping to state $4D_{3/2}$.

The system 500 may also comprise one or more compensation electrodes. The compensation electrodes 506 may comprise additional electrodes to which a different voltage can be applied in order to cause a change in the overall trapping electric field of the system 500. Alternatively, the compensation electrodes 506 may be moved in order to cause a change in the overall trapping electric field of the system 500. Each of the one or more compensation electrodes 506 may comprise a pair of rods to which a voltage is applied. Each of the rods of a compensation electrode 506 may be arranged adjacent to one of the electrodes configured to generate the oscillating electric field. In some embodiments, the first rod in a pair of rods of a compensation electrode may be arranged adjacent to a first oscillating electric field generating electrode and the second rod in the pair of rods of the compensation electrode may be arranged adjacent to a second oscillating electric field generating electrode. It will be appreciated that a first pair of oscillating electric field generating electrodes may be configured to have a fixed voltage applied thereto and a second pair of oscillating electric field generating electrodes may be configured to have a time-varying voltage applied thereto. The first oscillating electric field generating electrode may be one of those configured to have a fixed voltage applied thereto and the second oscillating electric field generating electrode may be one of those configured to have a time-varying voltage applied thereto.

The system 500 may further comprise a photon-collection device (not shown) configured to provide a measure indicative of the number of photons emitted by the ion 502 during the measurement step 307 of the interferometry sequence. In one or more embodiments, the photon-collection device may comprise a photomultiplier tube (PMT) or it may comprise another photon-collection device.

As has been described already, the interferometry sequence is repeated a plurality of times in order to obtain a plurality of measurements of the state of the ion. Then a probability of the trapped ion being in a given state can be determined. Determining the state of the same ion a plurality of times may comprise repeatedly performing the interferometry sequence on a single trapped ion in an ion trap. Repeatedly performing the interferometry sequence on a single trapped ion may comprise performing the interferometry sequence on the same trapped ion a plurality of times or may comprise performing the interferometry sequence on a first trapped ion in the trap, removing that trapped ion from the trap and trapping a new ion in the same trap and then repeating the interferometry sequence. A combination of these approaches may be taken. Alternatively, where a plurality of ions are trapped in the ion trap, performing the interferometry sequence a plurality of times may be achieved by performing the method on each, or a subset, of the plurality of trapped ions to simultaneously obtain a plurality of measurements. It will further be appreciated that the method may be repeated a plurality of times on a plurality of trapped ions, thereby utilising a combination of said techniques. In a two-level system $\{|g\surd, |e\rangle\}$, initialized in state $|g\rangle$, application of a laser field resonant to the $|g\rangle \leftrightarrow e\rangle$ transition couples the states, and causes the state of the system to oscillate between $|g\rangle$, superposition states of $|g\rangle$ and $|e\rangle$, and state $|e\rangle$. A pi/2 pulse causes state $|g\rangle$ or state $|e\rangle$ to evolve to a superposition state with equal $|g\rangle$ and $|e\rangle$ components. Application of a pi/2 pulse to a superposition state which has equal $|g\rangle$ and $|e\rangle$ components may cause the system to evolve to state $|g\rangle$, or to state $|e\rangle$, or to a different superposition state of $|g\rangle$ and $|e\rangle$, or it may even remain in the same superposition state, whichever of these outcomes that occurs depends on the phase relation between the superposition state and the laser field.

Figure 7:
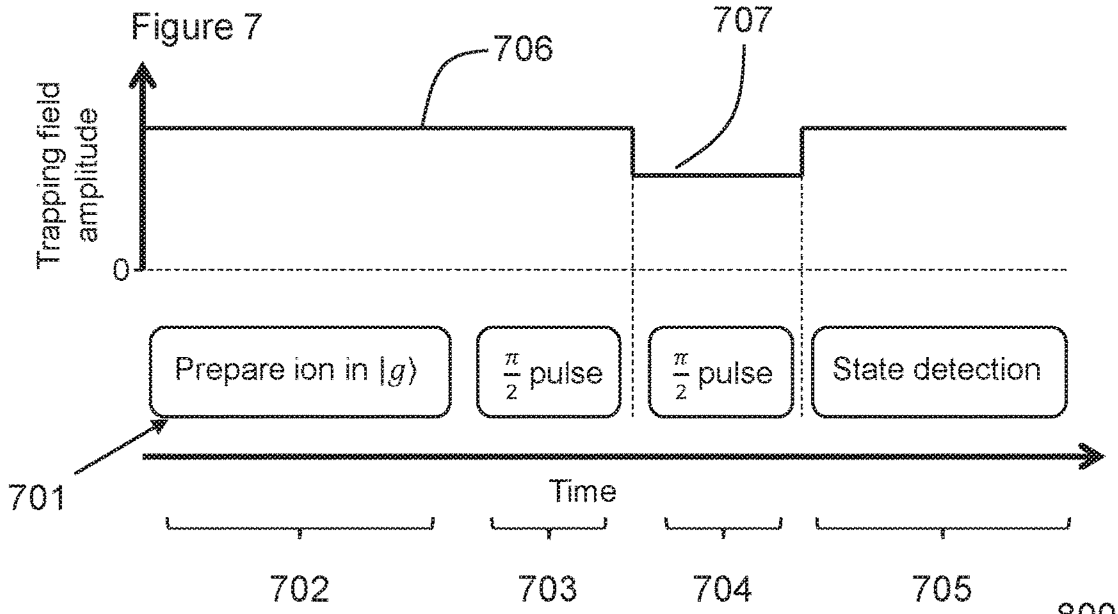
FIG. 7 shows an example pulse sequence of laser pulses and the corresponding electric field amplitude during said pulse sequence.

FIG. 7 shows a simplified example pulse sequence 701 for the process of inducing a change in the equilibrium position of the at least one trapped ion and measuring said change using interferometry. In a first time period 702, the system is initialised into a starting state while the trapping electric field amplitude is at a first electric field amplitude 706. In a second time period 703, a pi/2 pulse is applied to the ion when the trapping electric field is at the first electric field amplitude 706. In a third time period 704, a second pi/2 pulse is applied to the ion when the trapping electric field is at a second electric field amplitude 707, different to the first electric field amplitude. In a final time period 705, the state of the ion is detected while the electric field amplitude is at the first electric field amplitude 706.

A predetermined delay may be provided between the first and second laser pulses. The predetermined delay may be a sufficient time for the trapping electric field to be changed from the first electric field amplitude to the second electric field amplitude. In one or more embodiments, the predetermined time delay may be between 1 μs and 20 ms. The predetermined time delay may between 5 μs and 20 μs. The predetermined time delay may be 10 μs.

In one or more embodiments, the first laser pulse and the second laser pulse may be coherent laser pulses. The first and second laser pulses may have a phase difference $\phi_{laser}$ of pi/2 ($\pi/2$).

More specifically, in one or more embodiments, the first laser pulse may comprise a resonant pi/2 pulse and the second laser pulse may also comprise a resonant pi/2 pulse and the difference between phases of the laser fields may be $\phi_{laser}$=pi/2. Experiments involving two pi/2 pulses may be referred to as Ramsey interferometry experiments. It will be appreciated that other phase differences between the pulses may be used, for instance, a phase difference of 3*pi/2 may be used. When the magnitude of Δu along the direction of the laser field wavevector k is much smaller than the laser wavelength, such that $\phi_{mm}$«2*pi, when phase differences $\phi_{laser}$=pi/2 or $\phi_{laser}$=3*pi/2 are used, the probability of the ion being in the given state may respond most strongly to changes in $\phi_{mm}$ because, at this point, the magnitude of the rate of change of the probability $p_e$ with respect to $\phi_{mm}$ is greatest. Absent of an offset electric field, a probability of 0.5 may be expected when a phase difference $\phi_{laser}$ of 6pi/2 or 3*pi/2 is used. In some embodiments, $\phi_{mm}$ and therefrom information about the unwanted electric field E, may be estimated based on measurements of the probability of the ion being in the given state when the phase difference between the first and second laser pulses $\phi_{laser}$ is 6 pi/2 and 3*pi/2. Where the probability of the ion being in the given state when the phase difference is pi/2 is denoted as $p_e$ and the probability of the ion being in the given state when the phase difference is 3*pi/2 is denoted as $p_e'$, the phase $\phi_{mm}$ can be estimated from:

$$\phi_{mm} = \sin^{-1}\left(\frac{p'_e - p_e}{p_e + p'_e}\right) \quad \text{Eq. 8}$$

Estimation of $\phi_{mm}$ using two sets of measurements in this fashion may have the advantage of robustness to errors in the pulse strength and to errors caused by decoherence. If N/2 repetitions are conducted to determine $p_e$ and N/2 repetitions are conducted to determine $p_e'$, when $\phi_{mm}$«2π and $p_e \approx p_e' \approx 0.5$, then the uncertainties $\Delta p_e \approx \Delta p_e' \approx 1/\sqrt{(2N)}$ (due to quantum projection noise, using the normal approximation) and statistical uncertainty $\Delta\phi_{mm} \approx 1/\sqrt{N}$.

It will be appreciated that herein, where a phase difference is referred to, the unit of that phase difference will be radians. The omission of "radians" herein is provided for ease of readability and in line with the practice of those skilled in the art and is not intended to imply that the phase differences referred to herein are measured in any other units.

Figure 8:
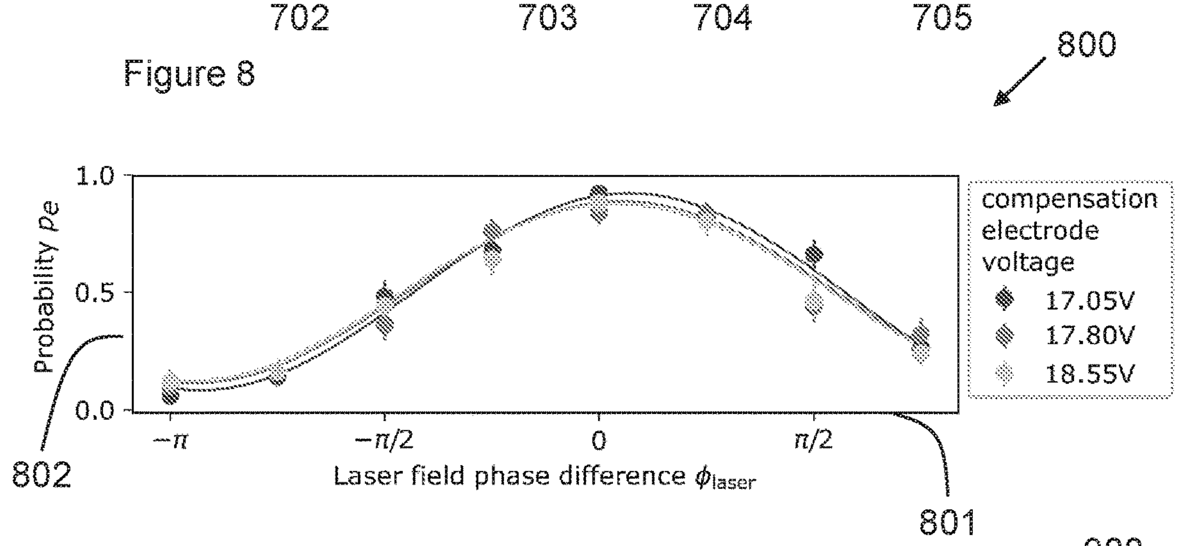
FIG. 8 shows experimental results of performing interferometry when not changing the trapping electric field amplitude between laser pulses.

FIG. 8 shows an example dataset 800 for interferometry performed on a trapped ion where the phase difference between the first and second laser pulses are provided along the x-axis 801 and the probability of the ion being in the given state (in this case, the state $|e\rangle$ ) is provided along the y-axis 802. In the example of FIG. 8, no change in trapping electric field amplitude was provided between the first and second laser pulses. In this example, the probability of being in the given state depends on the phase difference between laser pulses, $\phi_{laser}$, as expected from Equation 5. The experimental results are shown with three different offset electric field vectors E (kept constant throughout the pulse sequence) whose values depend on the voltage applied to a compensation electrode, voltages 17.05 V, 17.80 V and 18.55 V were used. Thus, while an offset electric field E may be present in the system measured in FIG. 8, a change in the equilibrium position Δu has not been induced in this example and, therefore, no information about the unwanted electric field E can be determined.

Figure 9:
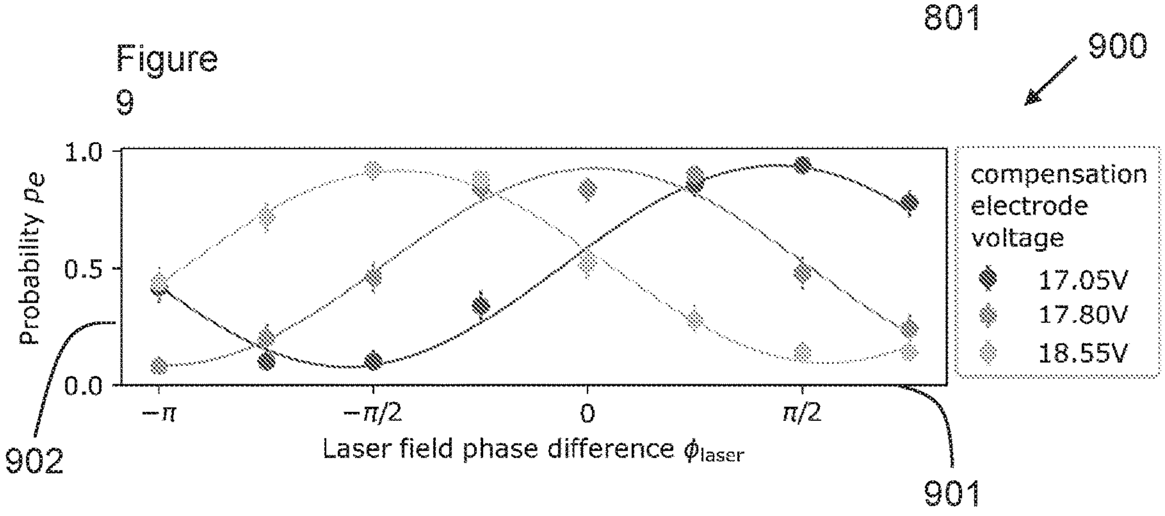
FIG. 9 shows experimental results of performing interferometry when changing the trapping electric field amplitude between laser pulses.

FIG. 9 also shows an example dataset 900 for interferometry performed on a trapped ion where the phase difference between the first and second laser pulses $\phi_{laser}$ are provided along the x-axis 901 and the probability of the ion being in the given state (in this case, the state $|e\rangle$ ) is provided along the y-axis 902. In the example of FIG. 9, a change in the trapping electric field amplitude between the first and second laser pulses was provided, as shown in the example pulse sequence of FIG. 7. In this example, the probabilities of the ion being in the given state determined were different at different offset electric fields E and the offset electric fields E cause the oscillation to be shifted by the phase $\phi_{mm}$.

Figure 10:
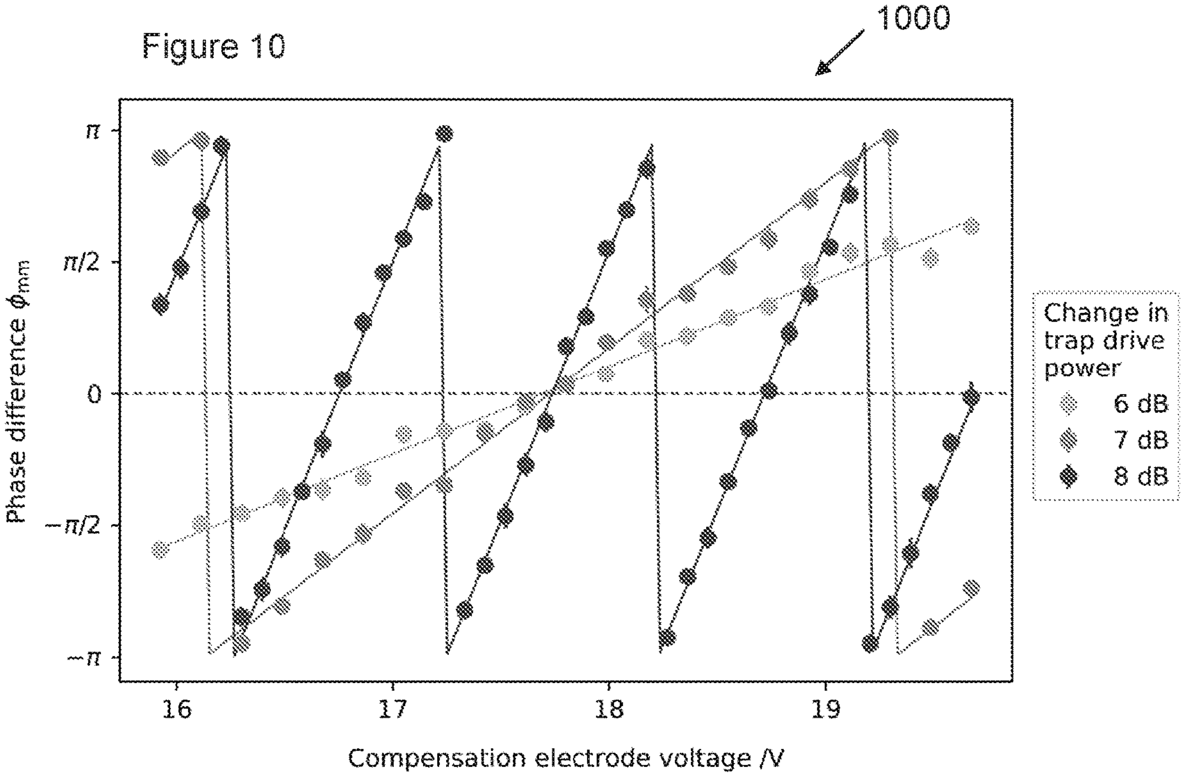
FIG. 10 shows 1-dimensional experimental results of changing an electric field offset and trap stiffness change on $\phi_{mm}$.

FIG. 10 shows example datasets 1000 which represent the results of how the phase difference $\phi_{mm}$ changes with changes to the voltage applied to a compensation electrode, and thus changes to the offset electric field E. The results of this dependence are shown for three different changes in the trapping electric field amplitude between application of the first laser pulse and application of the second laser pulse. These amplitude changes are introduced by changing the power of the RF signal applied to the trap electrodes between application of the first laser pulse and application of the second laser pulse. Power changes of 6 dB, 7 dB and 8 dB are used. It can be seen that the sensitivity of $\phi_{mm}$ to the offset electric field E can be enhanced by increasing the change of power of the RF signal and thus by increasing the change of the trapping electric field amplitude, due to its effect on $(\omega_2^{2}-\omega_1^{-2})$ in Equation 6. The change $(\omega_2^{2}-\omega_1^{-2})$ may be referred to as the trap stiffness change. It will be appreciated that the trap stiffness change has three components, since there are three spatial directions. For example, for the smallest trap stiffness change, brought about by the smallest RF power change, represented here, a wide range of voltages can be scanned in order to determine the voltage to apply to the compensation electrode to achieve a zero or near-zero phase $\phi_{mm}$ and zero or near-zero offset electric field component along the direction d along which the measurement is sensitive. Using larger trap stiffness changes may allow for an enhancement in sensitivity and thereby assist in identifying a more optimal compensation electrode voltage which provides for a reduction in the magnitude of the offset electric field E and the amplitude of the oscillating electric field at the ion equilibrium position. Since Equation 5 is cyclic, phase differences of $|\phi_{mm}|>\pi$ cannot be measured. Thus, in some examples, an enhancement in sensitivity provided by obtaining a plurality of probabilities of the trapped ion being in the given state (which is a function of $\phi_{mm}$) at a large trap stiffness change may come at the expense of reducing the total range of offset electric field values which may be interrogated. It is possible, if using a change in trapping electric field amplitude that is too large, to fall into a situation in which $\phi_{mm}=0$ while the magnitude of the offset electric field along the direction d along which the measurement is sensitive is far from zero, such as around 16.7 V or 18.7 V in FIG. 10 instead of the actual optimal trapping electric field using a compensation electrode voltage of approximately 17.7 V. This can be checked by changing a trap stiffness change. If the point is reached where the component of E along the direction d is 0, then $\phi_{mm}=0$ for all trap stiffness changes.

The solid lines throughout represent fits to the experimental data. The phase $\phi_{mm}$ varies linearly with the voltage applied to the compensation electrode, since $\phi_{mm}$ depends linearly on the component of the offset field E in the direction d, and because the components of E depend linearly on the voltage applied to the compensation electrode.

Thus, in some embodiments the method may comprise repeating the interferometry sequence and determining a probability that the trapped ion changes state during the interferometry sequence a first plurality of times. For each repeat of this group of steps in the first plurality of times, a different phase difference $\phi_{laser}$ laser between the first laser pulse and the second laser pulse may be used. This information may be used to obtain data such as that shown in FIG. 9. Adjusting the trapping electric field may be based on the first plurality of measurements of the probability of the trapped ion being in the given state.

Further, in some embodiments the method may comprise repeating the interferometry sequence, and determining a probability that the trapped ion changes state during the interferometry sequence a second plurality of times. For each repeat of this group of steps in the second plurality of times, a different trap stiffness change between the first laser pulse and the second laser pulse may be used. The trap stiffness change can be related to the attenuation in decibel (dB) of the power of the RF signal used to generate the oscillating field between the first laser pulse and the second laser pulse discussed with reference to FIG. 10. Adjusting the trapping electric field may be based on the second plurality of measurements of the probability of the trapped ion being in the given state.

It will be appreciated that varying the phase difference $\phi_{laser}$ laser between the first and second laser pulses and varying the trap stiffness change are described as first and second pluralities of times or measurements respectively, however, this nomenclature is provided for convenience of description. The nomenclature does not require that measurements of the plurality of phases must be performed before the measurements of the plurality of trap stiffness changes or even that one set of measurements must be provided at all in order to perform, and obtain information from, the other set of measurements.

In some embodiments, for each of the first plurality of times the steps of performing the interferometry sequence and determining the probability of the trapped ion being in a given state are performed, the same steps are repeated the second plurality of times. In this way, a plurality of probabilities of the ion being in the given state are obtained at combinations of different phase differences and different trap stiffness changes. Adjusting the trapping electric field may then be based on all of the determined probabilities or a subset of those probabilities. Obtaining this data may allow for the collection and use of data such as that shown in FIG. 10.

It has been described and shown in the above equations that inducing a change in an equilibrium position Δu of the at least one trapped ion and measuring said change using interferometry to determine a probability of the trapped ion being in a given state provides information about the offset electric field, E, along a direction d. Because of this, in order to provide enhanced reduction of the magnitude of the offset electric field E, in one or more embodiments, the method may comprise performing the method to determine said probability sensitive to E along at least each of a first direction $d_1$ and a second direction $d_2$ different from the first direction. Adjusting the trapping electric field may then be based on the measurement of the probability along the first direction, $p_1$, and the measurement of the probability along the second direction, $p_2$. The method may equally be implemented along a third direction $d_3$ in order to determine a probability along a third direction, $p_3$ to provide for information in three dimensions.

The first direction and second directions may comprise a wave vector k which is entirely, in the case of a linear Paul trap, in the plane of the oscillating electric field, such as along the (−1, −1, 0) direction or may comprise a wave vector k having a component out of the plane of the oscillating electric field, such as the direction (−1, 1, −√2). Where the direction of a laser pulse comprises a wave vector k having a component out of the plane of the oscillating electric field, it may comprise a projection onto the plane of the oscillating electric field. In other examples, the directional vector may comprise no projection onto the plane of the oscillating electric field. While the relative angle between the wave vectors k of the first and second directions may be any relative angle, in some embodiments the angle between the two vectors may be orthogonal.

Figure 11:
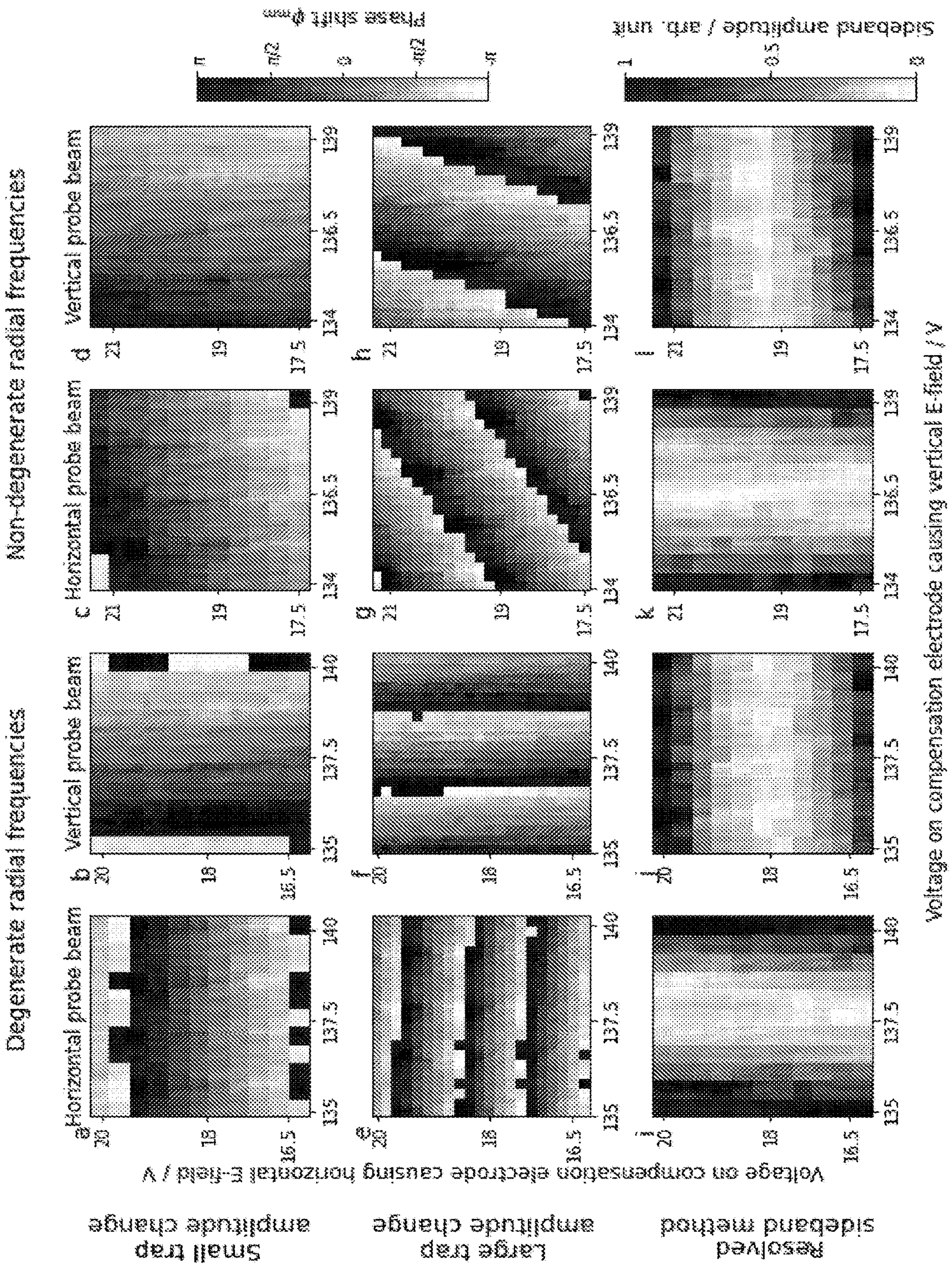
FIG. 11 shows 2-dimensional experimental results of changing an electric field offset and trap stiffness change on $\phi_{mm}$.

FIG. 11 shows a plurality of sub-graphs labelled as a –I. Sub-figures i–I show corresponding results obtained by the resolved side-band prior art method. The sub-figures show the voltage on the compensation electrode causing an electric field along a horizontal direction (y-axis) and the voltage on the compensation electrode causing an electric field along the vertical direction (x-axis) electric field. The degree of darkness of each pixel in the sub-figures a-h represents the measurement of the phase shift $\phi_{mm}$, as shown to the right of FIG. 11. Figures a, c, e and g show example results obtained where the probe laser, the laser which provides the first and second laser pulses, is provided along the horizontal direction (−1, −1, 0). Figures b, d, f and h show example results obtained where the probe laser is provided along direction (−1, 1, −√2) which has a vertical projection onto the plane of the oscillating field orthogonal to the direction of the horizontal laser (−1, −1, 0). Figures a, b, e and f show results for experiments where the values of $\omega_x$ and $\omega_y$ are approximately degenerate. To obtain the results of FIG. 11 *a-h*, the amplitude of the oscillating quadrupole field was changed while the amplitude of the static quadrupole field was maintained. Figures c, g, d and h show results for experiments where the values of $\omega_x$ and $\omega_y$ are not degenerate. Figures a-d show results where a first trap stiffness change is used between the first and second laser pulses and Figures e-h show results where a second trap stiffness change is used wherein the first trap stiffness change is less than the second trap stiffness change.

Referring first to FIG. 11, sub-figure a, results are provided where a relatively small trap stiffness change is used and the first and second laser pulses are provided along the horizontal direction. As may be expected, changing the value of offset electric field amplitude along the horizontal direction (the y-axis) results in a change to the phase of $\phi_{mm}$. In contrast, the phase is independent, or close to independent to the changes of the voltage on the electrode causing the vertical electric field. The same dependency can be seen in sub-figure e where a higher dependence of $\phi_{mm}$ on the electrode voltage can be seen as a result of the larger difference in the first electric field amplitude and the second electric field amplitude used in this example. These results can be likened and compared to those of FIGS. 9 and 10. Similar results can be seen in sub-figures b and f where the vertical probe is used and a dependency on the voltage on the electrode causing generation of the vertical electric field is evident.

Referring to FIG. 11, sub-figures a, e, b and f, it can be seen that with degenerate secular frequencies $\omega_x$ and $\omega_y$ the phase $\phi_{mm}$ depends strongly on the voltage on one of the compensation electrodes and weakly on the voltage on the other compensation electrode. This is because the directions of measurement sensitivity d are nearly aligned with the directions of the electric fields produced by the compensation electrodes. Referring to FIG. 11, sub-figures c, g, d and h it can be seen that with non-degenerate secular frequencies $\omega_x$ and $\omega_y$ the phase $\phi_{mm}$ depends on both the voltages on each of the compensation electrodes. This is because the directions of measurement sensitivity dare less well aligned with the directions of the electric fields produced by the compensation electrodes.

Referring to FIG. 11, sub-figures a, e and i, or sub-figures c, g and k, when a laser beam with a wave vector k along the horizontal direction is used, the technique disclosed herein is most sensitive to the horizontal component of E, while the prior art sideband method is most sensitive to the vertical component of E. By using both methods, information about E may be determined in two dimensions using only a single laser beam. This is advantageous for trapped ion systems with limited optical access. Similarly, referring to FIG. 11 sub-figures b, f and j or sub-figures d, h and I, when a laser beam with wave vector k with a vertical projection onto the plane of the oscillating field is used, the technique disclosed herein is most sensitive to the vertical component of E, while the prior art sideband method is most sensitive to the horizontal component of E.

Figure 12:
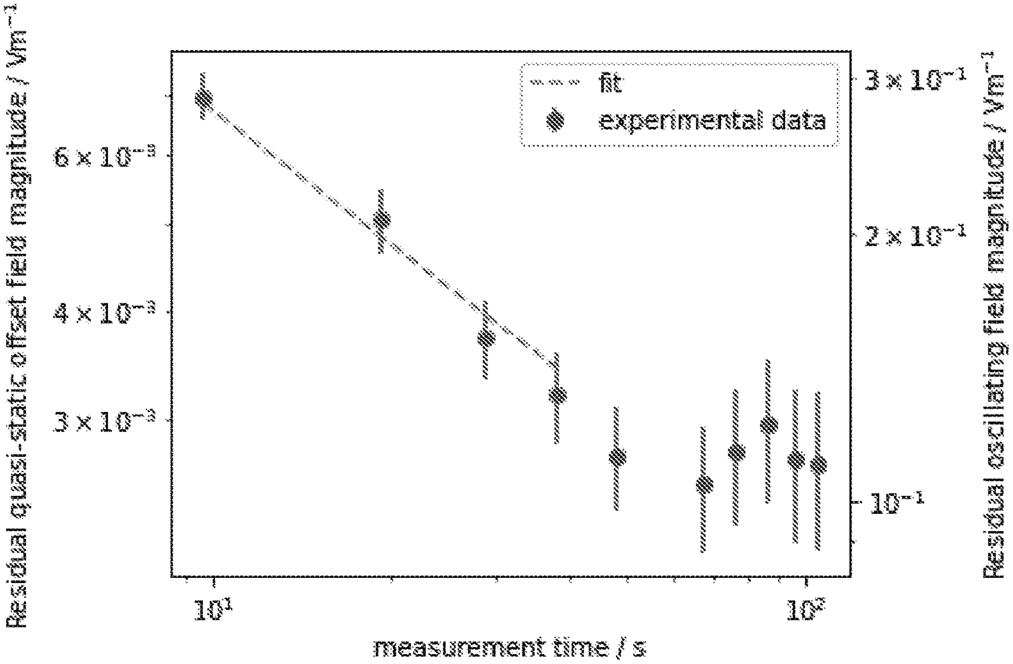
FIG. 12 shows experimental results representing the degree to which the magnitude of the offset field along a single direction can be reduced depending on the interrogation time used.

FIG. 12 shows the reduction of the magnitude of the residual unwanted field E along a single direction d that may be achieved using the method disclosed herein. With increasing interrogation time, the magnitude of the residual unwanted electric field decreases before it levels out. The levelling out may be due to time-variation of the background electric fields or to noise in the voltage supplies used to apply voltages to the trap electrodes. Using the method disclosed herein, the offset field E is reduced to a lower value in a single direction than has been achieved using the prior art. The magnitude of the offset field E along a single direction is reduced also at a higher rate than has been achieved using the prior art. The second y-axis shows the amplitude of the residual oscillating field at the ion equilibrium position that arises due to the residual quasi-static offset field at the position of the null of the oscillating field (shown on the first y-axis).

It will be appreciated that such measurements may also be made using a probe laser along the z-direction in order to obtain three-dimensional information on E.

By measuring the offset field Eat different times the drift of E over time can be measured. By taking into account this drift, the magnitude of the offset field E may be further reduced.

In some embodiments, where a plurality of probability measurements are being made, such as where a plurality of different probabilities are being measured at different phase differences or with different trap stiffness changes, the interferometry sequence may also be conducted using a fixed electric field amplitude. Probabilities derived from such measurements may be used to correct for the time-varying detuning of the laser field from the transition resonance frequency. This will allow systematic offsets in the estimate of $\phi_{mm}$ to be reduced or corrected.

In one or more embodiments, the average of the square of the amplitude of the oscillating electric field of the ion trap while the first laser pulse is applied and the square of the amplitude of the oscillating electric field of the ion trap while the second laser pulse is applied may be equal to the square of the amplitude of the oscillating electric field of the ion trap during an operational mode. An operational mode may be a mode of operation that the system is designed for, such as an optical clock or a quantum computing system. It will be appreciated that the method defined here is provided to reduce the magnitude of the offset electric field E and consequently the magnitude of the oscillating electric field at the ion's equilibrium position in order to reduce unwanted effects of excess micromotion and to reduce Stark shifts of energy levels. The trapped ion may then be implemented in any of a wide variety of applications. Such applications will operate under a standard trapping electric field amplitude. It will be understood that the square of the amplitude of the oscillating electric field is proportional to the power dissipated in the system. With greater power dissipation comes greater heating of the ion trap and changes in the temperature of the ion trap impact the trapping of the ion. As such, it may be beneficial to mitigate changes to the temperature when seeking to reduce the magnitude of the offset electric field E by having the average power dissipated in the system over the first and second laser pulses be equal to the average power dissipated in the system during its normal mode of operation.

There is also provided a computer readable medium having stored thereon software instructions that, when executed by a processor, cause the processor to generate control signals to cause a system such as that shown in FIGS. 5 and 6 to perform the above-described method.

The method and system presented herein may be applicable to a wide variety of systems, such as any system where the accurate trapping of an ion in an electric field is required. Such applications may include but are not limited to: an optical clock; a quantum computing system; a quantum simulator system; a trapped ion electric field sensor; and a trapped ion force sensor.

In a trapped ion system, an offset electric field that varies in time causes the trapped ion to experience an amount of excess micromotion that varies in time. This in turn causes the Doppler shift on a transition (due to excess micromotion) to vary in time. A varying offset electric field also causes the Stark shift to vary in time. By applying the described method from time to time in a system which utilises one or more trapped ions, the varying offset electric field can be kept under control, and the transition frequencies can be kept stable. Further, if the amount of excess micromotion changes, then the strengths with which transitions can be driven using a laser field change in time.

Trapped ion optical clocks require stable transition frequencies, and also accurate knowledge of resonance shifts. Thus, the presently disclosed method and apparatus may provide for improved trapped ion optical clocks.

In trapped ion quantum computers, simulators, network nodes and force sensors, different transitions need to be driven with high fidelity. If the strength of transitions changes in time, then the fidelity of operations decreases. Also, if the Doppler shifts and Stark shifts change in time, this causes resonances to shift and this also decreases the fidelity of operations. This is detrimental to their operation. Thus, by way of the advantages described herein, the presently disclosed method and apparatus may provide for improved trapped ion quantum computers, simulators, network nodes and force sensors.

In some examples, it may not be necessary to adjust the trapping electric field based on the determined probability in order to reduce the magnitude of the quasi-static electric dipole field at the null position of the oscillating electric quadrupole field of the ion trap. Instead, the method may comprise determining a probability that the trapped ion changes state during the interferometry sequence based on the plurality of measurements of the state of the ion, wherein the probability is indicative of the strength of the quasi-static electric dipole field Eat a null position of the oscillating electric quadrupole field of the ion trap and, based on the probability, parameters of a system in which the trapped ion is implemented may be varied to account for unwanted electric field effects. A system in which the trapped ion is implemented may be any relevant system, such as those discussed above including a trapped ion optical clock, a trapped ion quantum computer, simulator, network nodes or force sensor, for example. For example, in the case of a trapped ion optical clock, instead of adjusting the trapping electric field, the frequencies of the laser fields and the frequency of the optical clock may be adjusted. Similarly, in the case of a trapped ion quantum computer or simulator, instead of adjusting the trapping electric field, the frequencies of the lasers may be adjusted and the pulse lengths may be adjusted. Thus, it will be appreciated that the probabilities determined in the plurality of interferometry sequences may be used to correct for effects that result from the offset field E, such as Doppler shifts of the frequencies of transitions, rather than being used to reduce the magnitude of E.

The invention claimed is:

1. A method of reducing the magnitude of a quasi-static electric dipole field at the null position of an oscillating electric quadrupole field of an ion trap, the method comprising:

trapping one or more ions in a trapping electric field, wherein the trapping electric field comprises the oscillating electric quadrupole field and wherein the trapping electric field comprises an electric field amplitude which is a function of an electric field amplitude of the oscillating electric field;

inducing a change in an equilibrium position of one of the one or more trapped ions and measuring said change using an interferometry sequence comprising:

applying a first laser pulse to the one of the one or more trapped ions when the trapping electric field amplitude comprises a first trapping electric field amplitude;

applying a second laser pulse to the one of the one or more trapped ions when the trapping electric field amplitude comprises a second trapping electric field amplitude different from the first electric field amplitude; and measuring a state of the one of the one or more trapped ions after the application of the first and second laser pulses;

repeating the interferometry sequence a plurality of times in order to obtain a plurality of measurements of the state of the one or more trapped ions;

determining a probability that the one or more trapped ions change state during the interferometry sequence based on the plurality of measurements of the state of the one or more trapped ions; and adjusting the trapping electric field based on the determined probability in order to reduce the magnitude of the quasi-static electric dipole field at the null position of the oscillating electric quadrupole field of the ion trap.

2. The method of claim 1, wherein the trapping electric field further comprises a static electric field and wherein the trapping electric field amplitude is additionally comprised of an electric field amplitude of the static electric field.

3. The method of claim 1, wherein repeating the interferometry sequence is performed the plurality of times by one or a combination of:

performing interferometry sequence on a single trapped ion a plurality of times; and/or trapping a plurality of ions in the oscillating electric field and performing the interferometry sequence on each of the ions.

4. The method of claim 1, wherein the first laser pulse comprises a resonant pi/2 pulse and the second laser pulse comprises a resonant pi/2 pulse.

5. The method of claim 4, wherein the first laser pulse and the second laser pulse are coherent laser pulses and the first laser pulse and the second laser pulse have a phase difference of pi/2.

6. The method of claim 1, wherein the second laser pulse is provided at least a predetermined delay after the first laser pulse.

7. The method of claim 1, wherein the steps of:

repeating interferometry sequence a plurality of times in order to obtain a plurality of measurements of the state of the ion; and determining a probability that the trapped ion changes state during the interferometry sequence based on the plurality of measurements of the state of the ion;

are performed a first plurality of times wherein, for each repeat of these steps in the first plurality of times, a different phase difference between the first laser pulse and the second laser pulse is used; and wherein adjusting the trapping electric field is based on the first plurality of measurements of the probability.

8. The method of claim 7, wherein the steps of:

repeating the interferometry sequence a plurality of times in order to obtain a plurality of measurements of the state of the ion; and determining a probability that the trapped ion changes state during the interferometry sequence based on the plurality of measurements of the state of the ion;

are performed a second plurality of times wherein, for each repeat of these steps in the second plurality of times, a different trap stiffness change is applied to the trapping electric field amplitude between the first and second laser pulses, wherein the trap stiffness change depends on the first trapping electric field amplitude and the second trapping electric field amplitude; and wherein adjusting the trapping electric field is based on the second plurality of measurements of the probability.

9. The method of claim 8, wherein for each of the first plurality of times the steps of:

repeating the interferometry sequence a plurality of times in order to obtain a plurality of measurements of the state of the ion; and determining a probability that the trapped ion changes state during the interferometry sequence based on the plurality of measurements of the state of the ion, the steps of:

repeating the interferometry sequence a plurality of times in order to obtain a plurality of measurements of the state of the ion; and determining a probability that the trapped ion changes state during the interferometry sequence based on the plurality of measurements of the state of the ion are repeated the second plurality of times such that a plurality of probabilities are obtained at combinations of different phase differences and different trap stiffness changes; and wherein adjusting the trapping electric field is based on all of the determined probabilities.

10. The method of claim 1, wherein:

a first time the steps of:

repeating the interferometry sequence a plurality of times in order to obtain a plurality of measurements of the state of the ion; and determining a probability that the trapped ion changes state during the interferometry sequence based on the plurality of measurements of the state of the ion are performed, the method comprises providing the first and second laser pulses along a first direction; and a subsequent time the steps of:

repeating the interferometry sequence a plurality of times in order to obtain a plurality of measurements of the state of the ion; and determining a probability that the trapped ion changes state during the interferometry sequence based on the plurality of measurements of the state of the ion are performed, the method comprises providing the first and second laser pulses along a second direction, different to the first direction, wherein adjusting the trapping electric field is based on the first and subsequently determined probabilities.

11. The method of claim 10, wherein each of the first and second direction having one of:

a directional vector entirely in the plane of the oscillating electric field; or a directional vector having a component out of the plane of the oscillating electric field.

12. The method of claim 10, wherein the first and second directions are relatively orthogonal directions.

13. The method of claim 1, wherein the method further comprises:

measuring a detuning of a laser from a transition resonance frequency using interferometry by:

applying a first laser pulse to the trapped ion when the electric field amplitude comprises a fixed electric field amplitude;

applying a second laser pulse to the trapped ion when the electric field amplitude comprises the fixed electric field amplitude and the second laser pulse has a second phase different to the first phase; and measuring a state of the ion after the application of the first and second laser pulses;

repeating the process of measuring the detuning of the laser a plurality of times in order to obtain a plurality of measurements of the state of the ion determining a fixed electric field amplitude probability of the trapped ion being in the given state based on the plurality of measurements of the state of the ion;

wherein detuning of the laser is accounted for based on the fixed electric field amplitude probability.

14. The method of claim 13, wherein the method comprises alternating between determining the state of the trapped ion at electric field amplitudes which change between the first and second waveform pulses and determining the state of the trapped ion at the fixed electric field amplitude.

15. The method of claim 1, wherein the average of the square of the amplitude of the oscillating electric field during application of the first laser pulse and the square of the amplitude of the oscillating electric field during application of the second laser pulse is equal to the square of the amplitude of the oscillating field of the ion trap during an operational mode.

16. A non-transitory computer readable medium having stored thereon software instructions that, when executed by a processor of a system, cause the system to perform the method of claim 1.

17. A system configured to reduce the magnitude of a quasi-static electric dipole field at the null position of an oscillating electric quadrupole field of an ion trap comprising:

a plurality of electrodes configured to generate a trapping electric field for trapping at least one ion wherein the trapping electric field comprises the oscillating electric quadrupole field and wherein the trapping electric field comprises an electric field amplitude which is a function of an electric field amplitude of the oscillating electric field;

a first laser configured to apply laser pulses to the trapped ion and a detector;

the system configured to induce a change in equilibrium position of at least one trapped ion and use interferometry to measure said change using an interferometry sequence, by controlling:

the laser to apply a first laser pulse to the trapped ion when the electric field amplitude comprises a first electric field amplitude and to apply a second laser pulse to the trapped ion when the electric field amplitude comprises a second electric field amplitude different from the first electric field amplitude; and the detector to measure the state of the ion after the application of the first and second laser pulses;

wherein the system is further configured to:

repeat the interferometry sequence a plurality of times in order to obtain a plurality of measurements of the state of the ion;

determine a probability that the trapped ion changes state during the interferometry sequence based on the plurality of measurements of the state of the ion; and adjust the trapping electric fields based on the probability in order to reduce the magnitude of the quasi-static electric dipole field at the null position of the oscillating electric quadrupole field.

18. An optical clock comprising the system of claim 17.

19. A quantum computing system comprising the system of claim 17.

20. A quantum simulator system comprising the system of claim 17.

21. A trapped ion electric field sensor comprising the system of claim 17.

22. A trapped ion force sensor comprising the system of claim 17.

* * * * *